Aug. 21, 1951 T. H. WINKELJOHN 2,565,190
FLUID SEAL
Filed Sept. 28, 1946

INVENTOR.
Thomas H. Winkeljohn
BY
Evans + McCoy
ATTORNEYS

Patented Aug. 21, 1951

2,565,190

UNITED STATES PATENT OFFICE 2,565,190

FLUID SEAL

Thomas H. Winkeljohn, Wabash, Ind., assignor to The General Tire and Rubber Company, Akron, Ohio, a corporation of Ohio Application September 28, 1946, Serial No. 700,038

5 Claims. (Cl. 288—2)

This invention relates to oil sealing rings for moving machine parts and more particularly to an elastic, pliable sealing member adapted to seal the annular space between the concentric cylindrical surfaces, such as the space between the cylindrical surface of a shaft and a cylindrical surface of a housing.

In my prior application Serial No. 539,921, filed June 12, 1944, now Patent No. 2,417,390, of which this application is a continuation-in-part, I disclosed an oil sealing ring having a high degree of pliability and elasticity and being capable of adapting itself to the contours of the cavity to form a tight seal, which remains in place due to the wedging effect of portions of the ring against a conical stiffening member therein. While the seals disclosed in my aforementioned prior application are satisfactory for most commercial applications and are being manufactured and sold in quantity, they have been undesirable in certain applications for the reason that no positive means is provided for preventing removal of the coil spring from the assembled seal and for the reason that particles of hard material may become wedged between portions of the spring member, thus preventing efficient performance of the seal.

I am aware that many oil seals heretofore produced have been provided with a rigid exterior and a rigidly carried metal spring-retaining flange to completely enclose the annular spring-retaining groove. However, a rigid exterior and a rigidly carried flange is desirable in certain machinery as such seals have always required that the machine elements be very definite in size, and of smooth finish, and that the elements be concentric. Such seals have not heretofore been suitable for application where tolerances are relatively loosely held or where the finish of the machine parts adapted to contact the body of the seal is not entirely smooth.

It is an object of the present invention to provide oil seals which are capable of sealing annular spaces that are held at relatively loose tolerances, which may or may not be entirely cylindrical, and which may or may not be entirely smooth, yet which operates under all conditions met with in industrial applications.

Another object of the present invention is to provide an oil seal having a generally C-shaped cross section with an annular spring-containing groove enclosed by a movable, resiliently floating rigid flange, which fluid seal is adapted for assembly in a rough machined housing.

Other objects will be apparent from the following description of the invention, as illustrated by the accompanying drawing, in which.

Figure 1:
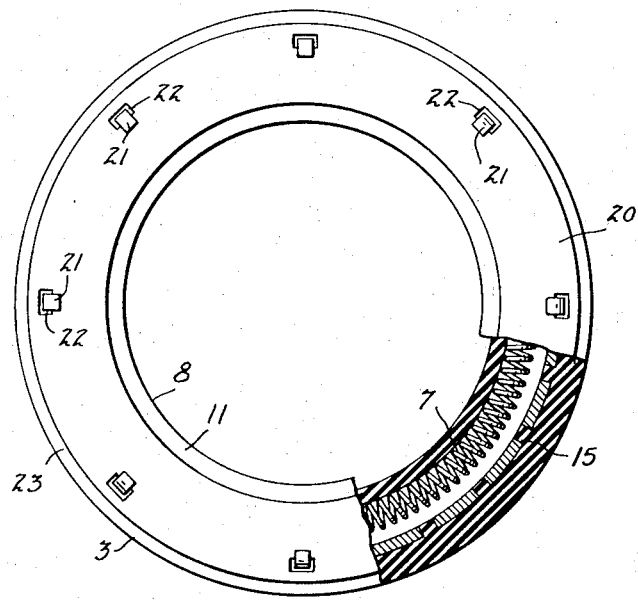
Figure 1 is an end elevational view, with parts broken away, of a seal embodying the present invention.
Figure 2:
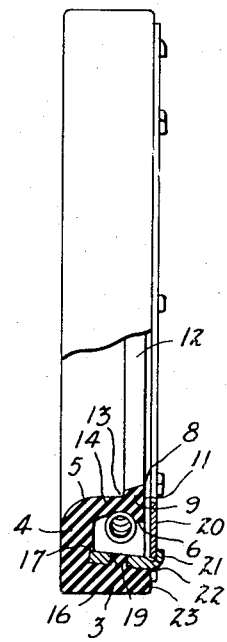
Fig. 2 is a side elevational view, partly in section, of the seal shown in Fig. 1 embodying the present invention.
Figure 3:
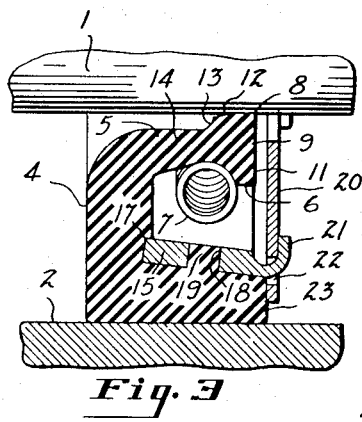
Fig. 3 is a sectional view through a portion of the seal embodying the present invention, showing it in sealing position between two relatively movable members.

Referring to the drawings where like parts are designated by like numerals of reference throughout the several views, it is seen from Figs. 1 to 3 inclusive, which show the usual application of my improved seals, that the sealing ring is disposed in the annular space between the external cylindrical surface of a shaft 1 and the internal cylindrical surface of a housing 2.

The body portion of the sealing ring is formed of a moldable elastic and pliable material such as a natural or synthetic rubber, which is preferably oil-resistant as are Neoprene and Perbunan type compounds. The rubber body of the ring is in the form of a laterally facing annular channel and has an outer flange 3, which is adapted to bear against one of the relatively movable machine elements such as the housing 2, an inner flange 5, and a flexible web 4 which connects the flanges 3 and 5 in an integral leak proof manner. The inner flange 5 has along its rim lip 6 that projects radially into the channel and serves as locating means for the annular coil spring 7. The endless coil spring 7 is mounted on the flange 5 within the channel and bears against the flange 5 tending to force it more strongly against the other relatively movable machine element such as the shaft 1. The flange 5 carries on its unattached end a sealing lip 9 which preferably has a frusto-conical face 12 adapted to bear against the shaft 1 or the machine element movable relative to the flange 5 and the body of the seal.

The lip 9 has a flat end face 11 which intersects with the conical interior face 12 at an acute angle to provide a yielding edge 8 adapted to maintain sealing engagement with the shaft 1.

The lip 9 has an inner curved face 13, which is so disposed with respect to the channel that the lip 9 is flexibly connected to the body of the flange 5 by a restricted annular neck portion 14, about which the annular lip 9 may flex to accommodate itself to the shaft 1. The ability of the sealing lip 9 to flex about the restricted neck 14 provides an effective seal against fluid under pressure since pressure acting against the face of the ring will increase the pressure of the lip 9 against the cylindrical surface with which it engages.

A metal stiffening ring 15 of any suitable shape is mounted upon the interior of the flange 3. The ring 15 is preferably radially flexible, i. e., unflanged so that it may be deformed to an oval shape by strong pressure without rupture or kinking of a radial flange. A conical form tapering from the side of the ring to which the channel opens toward the web 4 has advantages over either a flat ring (tubular section) or a flanged ring in this respect. The rubber body of the sealing ring is preferably molded and vulcanized upon the stiffening ring 15, which may be placed upon the core that fills the channel of the ring during the molding operation. The smaller end of the ring 15 projects a short distance into the web 4 so that an annular shoulder 17 of rubber engages the interior of the ring at its small end. The ring is preferably provided with a circumferential row of openings 18 in which projections 19 of the rubber body fit. The ring 15 is firmly held in place within the ring channel by the shoulder 17 and projections 19. Also, a suitable adhesive is preferably used on the metal prior to molding of the seal body to bond the rubber to the metal during the molding operation.

The sealing ring of the present invention has a considerable range of radial compressibility both interiorly and exteriorly of the rigid reinforcing ring 15.

I have found that the conical form of the ring 15 gives the required stiffness to the ring, being stiffer than an annular tubular section but sufficiently more flexible than a flanged stiffener, to permit the seal to function in noncircular housings and the like. The conical section provides an elastic deformable cushion between the ring 15 and the housing wall, which facilitates the entry of the ring into openings of less diameter than the ring, and which enables the ring to conform more readily to surfaces that have portions of different diameters or which may vary from true circular form to a greater extent by reason of the tapering form of the rubber cushion provided by the flange 3. Also compression of the rubber between the ring 15 and housing wall causes the rubber to press radially inwardly on the elastic web 4 and stiffen the same, so as to assist the interior lip 9 to maintain effective sealing engagement with the shaft 1.

The flange 3 serves as a positioning flange, while the flange 5 is adapted to have sealing engagement with the surface of a rotating shaft. The annular spring 7 bears against the interior face of the flange 5, between the sealing lip 9 and the web 5 to which the flange is connected, and exerts a radial pressure on the flange 5 to retain the tip 8 of the wiping lip 9 in engagement with the shaft 1. Since the lip 9 is flexibly connected to the rim portion of the flange 5, and the flange 5 is flexibly connected to the positioning flange 3 by the web 4, it has a considerable range of yieldability. By reason of its flexible connection to the flange 5 the lip 9 may yield to accommodate shafts of different diameters or to accommodate a shaft offset slightly from concentric position without the creation of excessive friction due to pressure on the engaging surface 12 of the wiping lip. The range of expansion and contraction of the wiping lip is increased considerably by reason of the fact that both the flange 5 and web 4 are flexible.

In accordance with the present invention, a rigid radial flange 20 of rigid material, such as metal, is provided over the annular laterally facing spring-containing channel to facilitate assembly of the seal into the housing, to retain the spring permanently within the channel and to prevent freezing of the spring and other parts of the seal by sedimentary deposits and the like within the channel.

The flange 20 is carried by attaching means, such as the annularly spaced locking lugs 21 which are integrally connected to the stiffening ring 15 and which cooperate with the windows 22 through which they protrude. The lugs 21 may be straight prior to assembly of the flange 20 thereon and may be bent as shown after the assembly to provide a portion which bears against the outer radial surface of the radial flange 20 to hold the assembled parts in position. Since the stiffening ring 15 carrying the flnge 20 is resiliently supported, it is apparent that the flange 20 is also resiliently supported. The windows 22 are preferably of somewhat greater diameter than the lugs 21 to permit relative radial deformation due to necessary bending of the stiffening ring 15 to fit the contour of the housing. Substantially the same effect can also be obtained from the bending of these relatively deformable lugs 21 without slippage within the window 22. Thus when it is desirable to provide connections between the lugs 21 and the flange 20 which do not permit relative slippage between the lugs and the flange when the stiffening ring 15 is subjected to limited deformation to oval shape by the housing of shaft, the result may be accomplished by the bending of the lugs which are of relatively small cross section compared to the periphery of the ring 15 to which they are attached.

The outer diameter of the outer annular resilient flange 3 is substantially greater than the diameter of the radial channel-covering flange 20 to provide an annular deformable mass 23 of resilient material. The resilient material may be compressed before contact can be had between the flange 20 and the housing 2. It is thus seen that the channel-sealing flange 20 is resiliently carried between the housing and the shaft and that the adaptability of the seal is not interfered with.

Figure 4:
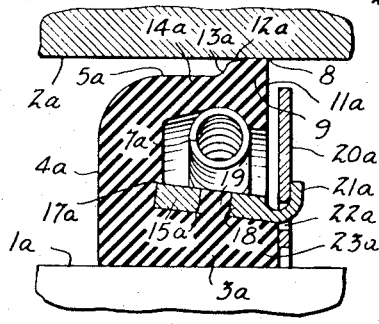
Fig. 4 is a similar view of a modified form of seal in which the sealing lip which bears against a machine element is movable relative to the body of the seal and is on the external periphery.

In the modification of Fig. 4, a modified form of seal is shown which differs from that of Figs. 1 to 3 by having the positioning and sealing flanges reversed and the spring is under compression instead of tension. In this view parts corresponding to those shown in Figs. 1 to 3 inclusive are indicated by the same reference numerals with the letter "a" added.

The fluid seal of Fig. 4 has a positioning flange 3a that is adapted to engage the external cylindrical surface of the shaft 1a, which surface may or may not be entirely cylindrical, a sealing lip 9 that is adapted to engage the internal cylindrical surface of the housing 2a, a stiffening ring 15a and a spring 7a that exerts a radial outward pressure on the flange 5a.

Figure 5:
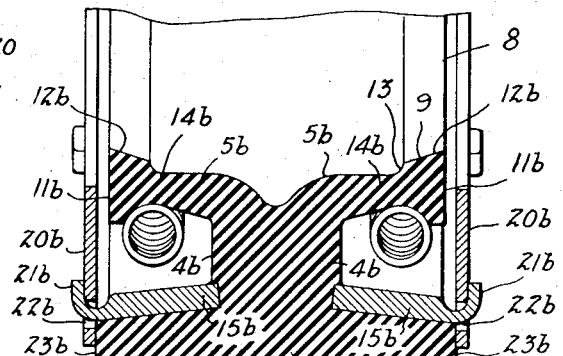
Fig. 5 is a sectional view through a portion of another modified form of seal embodying the present invention.

In Fig. 5, another modified form of seal is shown. This double seal is a form of seal that is especially adapted for sealing surfaces subjected to relative sliding position, as had by a piston and cylinder, or where fluids have a tendency to flow in both directions. In Fig. 5, the parts corresponding to those of Figs. 1 and 3 are indicated by the same reference numerals with the letter "b" added.

It will be seen that the nonrigid attaching means, i. e. windows 22a radially larger than the lugs 21a, permit the advantages obtainable by a rigid flange without detracting from the radial deformability (to oval shape) of the stiffening ring 15a.

It is to be understood that the particular structures herein illustrated and described may be modified without departing from the invention as defined by the appended claims.

What I claim is:

1. A sealing ring for insertion between substantially concentric and substantially cylindrical surfaces of relatively movable machine elements, comprising a body of elastic and pliable material having the form of a laterally facing channel with radially spaced annular positioning and sealing flanges and a connecting web, said positioning flange having an annular outer face for stationary engagement with one of said substantially concentric outer surfaces of one of said movable elements, said sealing flange having in the region of its unattached end an annular sealing lip for engagement with the other of said substantially cylindrical surfaces, an annular spring within the channel bearing against said sealing flange, a radially deformable stiffening ring bearing against said positioning flange and circumferentially enclosed by portions thereof, and a rigid flange having a diameter less than that of said positioning flange and being disposed over the open end of said laterally facing channel, and a lost motion connection between said rigid flange and said annular stiffening ring, said lost motion connection permitting limited radial deformation of portons of said stiffening ring without causing radial deformation of said rigid flange.

2. A fluid seal for sealing an annular space between inner and outer, substantially concentric, relatively movable machine elements, comprising a body of elastic and pliable material having the form of a laterally facing channel with radially spaced annular positioning and sealing flanges and a web connecting said flanges in fluid-tight relation, said positioning flange having an annular outer surface for stationary engagement with one of said concentric surfaces and a sloping inner face, said sealing flange carrying an annular sealing lip displaced laterally from the attached end of said flange for engagement with the other of said machine elements, an annular spring within the channel bearing against said sealing flange, a stiffening ring of conical form fitting within the conical face of said positioning flange, a radial flange of metal over the annular laterally facing spring-containing channel, said radial flange having a diameter less than said positioning flange, and a bendable connector between said radial flange and said stiffening ring, said bendable connector being less rigid than said flange, whereby it permits limited radial distortion of portions of said stiffening member without causing radial deflection of said radial flange, said bendable connector having but small circumferential extent compared to the circumference of said stiffening and said flange.

3. A fluid seal for sealing an annular space between inner and outer, substantially concentric, relatively movable machine elements, comprising a body of elastic and pliable material having the form of a laterally facing channel with radially spaced annular positioning and sealing flanges and a web connecting said flanges in fluid-tight relation, said positioning flange having an annular outer surface for stationary engagement with one of said concentric surfaces and a sloping inner face, said sealing flange carrying an annular sealing lip displaced laterally from the attached end of said flange for engagement with the other of said machine elements, an annular spring within the channel bearing against said sealing flange, a stiffening ring of conical form fitting within the conical face of said positioning flange, a radial flange of metal over the annular laterally facing spring-containing channel, said radial flange having annularly spaced windows, said stiffening ring carrying annularly spaced locking lugs protruding through said windows, said lugs having a portion which bears against the outer radial face of said radial flange, said windows having a radial dimension greater than the radial dimension of said lugs, whereby said stiffening ring may be deformed to limited radial extent without causing noticeable radial deformation of said radial flange.

4. A fluid seal for sealing an annular space between inner and outer, substantially concentric, relatively movable machine elements, comprising a body of elastic and pliable material having the form of a laterally facing channel with radially spaced annular positioning and sealing flanges and a web connecting said flanges in fluid-tight relation, said positioning flange having an annular outer surface for stationary engagement with one of said concentric surfaces and a sloping inner face, said sealing flange carrying an annular sealing lip displaced laterally from the attached end of said flange for engagement with the other of said machine elements, an annular spring within the channel bearing against said sealing flange, a stiffening ring of conical form fitting within the conical face of said positioning flange, a radial flange of metal over the annular laterally facing spring-containing channel, said radial flange having annularly spaced windows, said stiffening ring carrying annularly spaced locking lugs protruding through said windows, said lugs having a portion which bears against the outer radial face of said radial flange, said lugs being less rigid than said radial flange, whereby they may be deformed against said flange, and whereby said stiffening ring may be deformed to limited radial extent without causing noticeable radial deformation of said radial flange.

5. The seal of claim 1 in which the connection between said rigid radial flange and said stiffening ring is through a plurality of relatively readily deformable lugs that extend through windows of greater radial thickness than the thickness of said lugs.

THOMAS H. WINKELJOHN.

REFERENCES CITED

The following references are of record in the file of this patent:

UNITED STATES PATENTS

| Number | Name | Date |
|---|---|---|
| 2,104,188 | Cotterman | Jan. 4, 1938 |
| 2,208,482 | Victor | July 16, 1940 |
| 2,417,390 | Winkeljohn | Mar. 11, 1947 |